United States Patent [19]

Schaumburg

[11] 4,179,908
[45] Dec. 25, 1979

[54] STEERING LOCK

[75] Inventor: Günter Schaumburg, Radevormwald, Fed. Rep. of Germany

[73] Assignee: Neiman S.A., Courbenoie, France

[21] Appl. No.: 867,203

[22] Filed: Jan. 5, 1978

[30] Foreign Application Priority Data

Jan. 7, 1977 [DE] Fed. Rep. of Germany ....... 2700581

[51] Int. Cl.² ............................................. E05B 65/12
[52] U.S. Cl. ....................................... 70/185; 70/252; 70/360
[58] Field of Search .................. 70/185, 184, 252, 360

[56] References Cited

U.S. PATENT DOCUMENTS

| 1,126,262 | 1/1915 | Nichols | 70/252 |
| 1,342,728 | 6/1920 | Welch | 70/360 |
| 1,951,418 | 3/1934 | Jacobi | 70/360 |
| 2,148,609 | 2/1939 | Edwards | 70/252 |

Primary Examiner—Robert L. Wolfe

Attorney, Agent, or Firm—William A. Drucker

[57] ABSTRACT

The steering lock for vehicles, more especially for motor cycles, comprises a lock reception housing which is secured to a tube of the vehicle steering shaft and in which there are arranged in an axially parallel manner a locking bolt to be introduced into the steering shaft and a cylinder lock so as to be axially displaceable and being connected, and comprises a cylinder housing, a cylinder core within the housing, a locking part which projects beyond the cylinder housing and can be introduced, for fixing the cylinder lock in the locking positions, into a recess of the lock reception housing.

The locking part is a ring sector which, in the locking position, projects with one area into the recess of the lock reception housing in an interlocking manner and stays with the remaining area in a recess of the locking bolt, which recess receives the ring sector in the displaced position and comprises a surface which is vertical to the locking bolt longitudinal axis.

8 Claims, 2 Drawing Figures

STEERING LOCK

BACKGROUND TO THE INVENTION

The invention relates to a steering lock, more especially for motor cycles, comprising a lock reception housing which is fixedly connected to the vehicle steering assembly and in which a locking bolt, which is insertable into the steering shaft, and a cylinder lock are located in an axially parallel manner so as to be axially displaceable and being fastened to one another, and comprising a locking part which is secured to the cylinder core and projects beyond the cylinder housing and can be inserted into internal recesses in the lock reception housing so as to fix the cylinder lock in the locking positions.

PRIOR ART STATEMENT

Such a steering lock is known from German Patent Application No. b 15 402 II/63c which has been laid open. On this known steering lock, the cylinder core comprises, for arresting the longitudinal displaceability of the locking bolt, a radial pin which, in the locking position, penetrates into one of two grooves in the lock reception housing and by this means fixes both the cylinder lock and the locking bolt secured to the cylinder lock. Upon the forced twisting of the steering shaft, the steering shaft exerts a shearing force on the locking bolt, causing it to be pressed axially into the lock reception housing. This axial pressure is transferred from the locking bolt to the cylinder lock and from this latter to the free-standing locking pin. The cylinder lock, which as a rule is made of a material that is less solid than the locking bolt and is preferably given small dimensions for cost reasons, is unsuitable for stresses of this kind. Furthermore, the locking member fixedly connected to the rotatable cylinder core is subjected to shearing stress in the reception housing recess and has to have a cross section of corresponding size. In order to construct this known steering lock in an operationally reliable and rugged manner, it would be necessary to construct the cylinder lock, the locking member and thus the entire steering lock in dimensions which are so large that it could hardly be used for vehicles. Over and above this, the production thereof would be more elaborate and expensive.

OBJECT OF THE INVENTION

The object of the invention is to improve a steering lock of the kind mentioned at the beginning in such a way that a higher compressive stress can be absorbed while the dimensions are the same and the construction is simple.

SUMMARY OF THE INVENTION

According to the invention there is provided a lock for a vehicle steering column having a steering shaft rotatable within a fixed tube, comprising a lock reception housing for connection to the steering wheel tube, said reception housing being formed with first and second intercommunicating spaced bores, the axes of which are disposed parallel to each other, a locking bolt within said first bore arranged to move axially between a first position and a second position where the bolt enters an aperture in the steering shaft, an abutment surface on said locking bolt disposed transversely of the axis of said bolt, a cylinder housing within said second bore axially displaceable between a first position and a second position and drivably coupled with said locking bolt, a cylinder core having a key entry aperture, rotatable within the cylinder housing, a locking recess formed in the internal surface of the reception housing, and a locking part connected to said cylinder core projecting radially beyond the cylinder housing and capable of entry into said locking recess for securing the cylinder lock in its second position, wherein on axial movement of the cylinder housing into its second position rotation of the core is possible whereby the locking part projects with one portion thereof into the recess within the reception housing, the remaining portion being in engagement with the abutment surface on the locking bolt.

Further, the locking part comprises a ring sector extending from a ring secured to the cylinder core.

In the case of the lock according to the invention, the pressure exerted on the locking bolt is not transferred via the cylinder lock to the locking part and the lock reception housing, but the forces exerted on the locking bolt are directly absorbed by the ring-sector-shaped locking part and are passed on to the lock reception housing. The locking part forms a frictional and positive connection between the locking bolt and the lock reception housing and keeps away any stress from the cylinder lock. There is no need for the cylinder lock to be more robust in construction than is usual, and the ring-sector-shaped locking part is capable of absorbing high forces.

In a further development, the invention proposes that the ring sector should be formed integrally with a ring, which is concentrically fastened on the cylinder core jacket, so that it is concentrically located on the outside thereof. Such an integral design of the ring sector with a ring allows a simple fastening to the cylinder core without designing the cylinder core differently as is usual. The ring may be fastened on the cylinder core section which projects from the cylinder housing on the side that is remote from the key.

In order to ensure a reliable transfer of force, the surface of the locking bolt should rest closely against the front end of the ring sector. A simple production of the locking bolt is brought about in that the locking bolt surface resting against the ring sector is formed by a recess.

The ring sector will have sufficient strength if its front ends have a width which corresponds approximately to the width of the face of the cylinder housing portion receiving the locking pins. If the ring segment were to be constructed even wider, then the longitudinal opening of the lock reception housing required for axial displaceability would have to be widened, which would cause a weakening of the lock reception housing.

BRIEF DESCRIPTION OF DRAWINGS

An exemplified embodiment of the invention is shown in the drawings and will be described in more detail hereinafter. In the drawings.

DESCRIPTION OF PREFERRED EMBODIMENT

Figure 1:
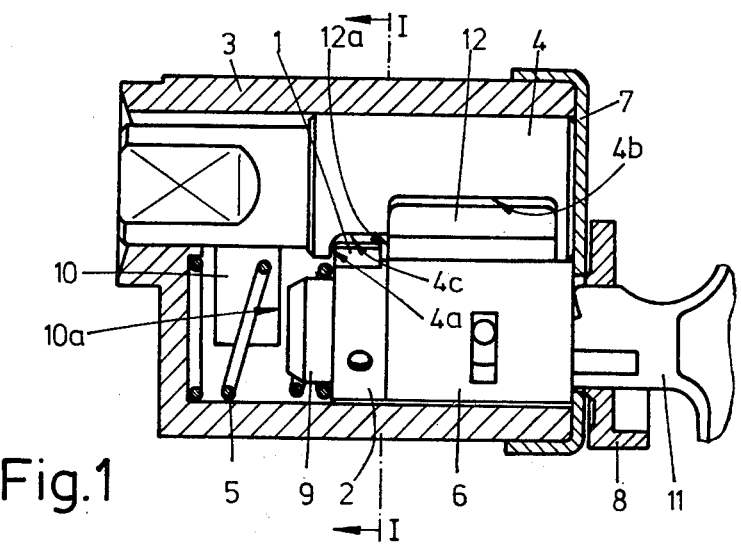
FIG. 1 is a longitudinal section through the steering lock according to the invention.

Two parallel bores of equal diameter are arranged closely side by side in a fixedly installable lock reception housing 3 and are connected by a longitudinal passage 13. The bore receiving a locking bolt 4 extends through the entire lock reception housing and is thus opened towards both sides, while the bore receiving a cylinder lock is closed towards the longitudinal spindle (not shown) and only comprises an opening in the direction of the opposite side for the insertion of a key 11. On the side that is remote from the longitudinal spindle, the lock reception housing is provided with a covering cap 7 which comprises, for the introduction of the key, an opening which can be covered by a swivelling cover 8.

For the formation of a recess 4b, there is provided in the locking bolt 4 a U-shaped groove which is vertical to the locking bolt longitudinal axis and in which the part 12 of the cylinder housing 6 receiving the housing pins is located in a form-fitting manner. In the cylinder housing 6, there is rotatably mounted the cylinder core 9 which projects to some extent from the cylinder housing on the side that is remote from the key and carries a ring 2, whose inside radius is identical with the outside radius of the cylinder core 9 and whose outside radius is identical with the outside radius of the cylinder housing 6. One front end of the ring 2 closely abuts the front end of the cylinder housing 6 or is only a short distance therefrom and comprises, for the formation of a locking part, a ring sector 1 which projects radially beyond its circumferential surface and is coaxial to the ring 2 and, in the non-locking position, covers the area of the cylinder housing portion 12 receiving the housing pins, which area adjoins the cylindrical portion of the cylinder housing, and thus has the width of the cylinder housing portion 12.

The ring sector 1 may have the same axial extension as the ring and thus rests with its face against the face 12a of the cylinder housing portion 12 or alternatively may be a short distance from the face 12a. However, the opposite face of the ring sector 1 always rests closely against a surface 4a of the locking bolt 4, which face is vertical to the locking bolt longitudinal axis and is formed by a recess 4c of the width or axial extension of the ring 2.

The cylinder core 9 projects, with an end portion, from the ring 2, on which there is fastened a helical compression spring 5 which is supported with one side on the ring 2 and with the opposite side on an inner wall of the lock reception housing. The cylinder lock and the locking bolt can be moved against the pressure exerted by this spring 5 by the key pressure from the position shown in FIG. 1 to a second position in the unlocked state, in which position the locking bolt 4 projects from the lock reception housing 3 and the ring sector is no longer at the level of a first groove (not shown) but is at the level of a second groove 10, into which the ring sector 1 can be swung by the rotation of the key to the locking position.

Figure 2:
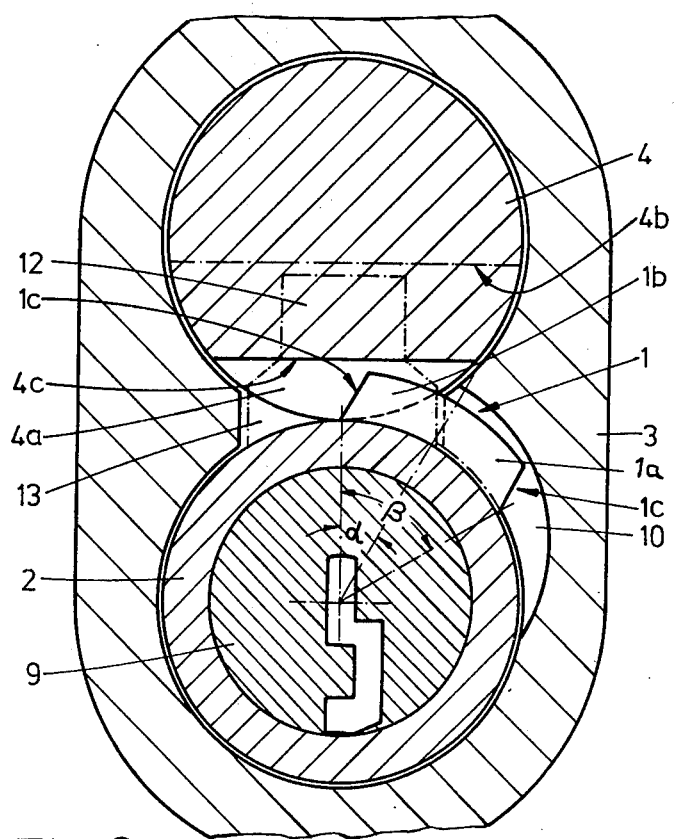
FIG. 2 is a section along I—I in FIG. 1.

In the locking position, the ring sector 1 is not located fully in the groove 10, as shown in FIG. 2, but only an area 1a thereof is, so that a second area 1b of the ring sector stays in the recess 4c. This is brought about in that the angle α, through which the cylinder core is rotated from the unlocked position to the locking position, is only approximately half as large as the centre angle β of the ring segment 1 is. In the locking position, the surface 4a of the locking bolt closely abuts the area 1b and the side edge 10a of the groove 10 closely abuts the opposite area 1a of the ring segment. By this means, the ring segment 1 transmits any forces acting on the locking bolt 4 directly to the lock reception housing 3.

There is no absolute need for the arrangement of the side surfaces 1c of the ring sector or ring portion to be radial, and they may be directed differently. The ring sector shown in FIG. 2 has, for example, parallel side walls 1c.

I claim:
1. A lock for a vehicle steering column having a steering shaft rotatable within a fixed tube, comprising:
    (a) a lock reception housing for connection to the steering wheel tube, said reception housing being formed with first and second intercommunicating spaced bores, the axes of which are disposed parallel to each other,
    (b) a locking bolt within said first bore arranged to move axially between a first position and a second position where the bolt enters an aperture in the steering shaft,
    (c) an abutment surface on said locking bolt disposed transversely of the axis of said bolt,
    (d) a cylinder housing within said second bore axially displaceable between a first position and a second position and drivably coupled with said locking bolt,
    (e) a cylinder core, having a key entry aperture, rotatable within the cylinder housing,
    (f) a locking recess formed in the internal surface of the reception housing, and
    (g) a locking part connected to said cylinder core projecting radially beyond the cylinder housing and capable of entry into said locking recess for securing the cylinder lock in its second position, wherein on axial movement of the cylinder housing into its second position rotation of the core is possible whereby the locking part projects with one portion thereof into the recess within the reception housing, the remaining portion being in engagement with the abutment surface on the locking bolt.

2. A lock according to claim 1 wherein the locking part comprises a ring sector extending from a ring secured to the cylinder core.

3. A steering lock according to claim 2, wherein the ring is secured on that end of the cylinder core which projects from the cylinder housing on the side remote from the key entry aperture.

4. A steering lock according to claim 2, wherein said abutment surface on the locking bolt closely abuts the front end of the ring sector in any rotation position of the latter.

5. A steering lock according to claim 2, wherein an end face of the cylinder housing rests against the ring sector.

6. A steering lock according to claim 2 wherein the recess within the internal surface of the lock reception housing is a part annular groove having a width equal to the width of the ring sector.

7. A steering lock according to claim 1, wherein for the connection of the locking bolt to the cylinder housing, the locking bolt comprises a recess, in which a portion of the cylinder housing engages.

8. A steering lock according to claim 1, wherein a helical compression spring is arranged between the side of the cylinder core that is remote from a key entry aperture and the opposite inner wall of the lock reception housing.

* * * * *